United States Patent [19]

Gratzmuller

[11] 4,296,910
[45] Oct. 27, 1981

[54] HYDRAULICALLY CONTROLLED SAFETY VALVE

[76] Inventor: Jean L. Gratzmuller, 66 Boulevard Maurice Barrès, 92200 Neuilly sur Seine, France

[21] Appl. No.: 936,510

[22] Filed: Aug. 24, 1978

[30] Foreign Application Priority Data

Aug. 29, 1977 [FR] France .................. 77 26157
Jul. 12, 1978 [FR] France .................. 78 20767

[51] Int. Cl.³ .................. F16K 31/12; F16K 31/122
[52] U.S. Cl. .................. 251/28; 91/5; 91/461; 60/413
[58] Field of Search .................. 137/2; 60/413; 91/5, 91/461, 454; 251/28

[56] References Cited

U.S. PATENT DOCUMENTS

| 2,900,960 | 8/1959 | Gratzmuller | 91/461 |
| 2,948,262 | 8/1960 | Gratzmuller | 91/461 |
| 3,252,381 | 5/1966 | Gratzmuller | 91/461 |
| 3,613,070 | 10/1971 | Jones et al. | 251/30 |
| 3,814,375 | 6/1974 | Grotloh | 251/28 |
| 3,906,726 | 9/1975 | Jameson | 60/413 |
| 3,963,039 | 6/1976 | Coeurderoy | 60/413 |
| 4,036,106 | 7/1977 | Athy, Jr. | 91/5 |
| 4,141,533 | 2/1979 | Goodman | 60/413 |

Primary Examiner—Martin P. Schwadron
Assistant Examiner—G. L. Walton
Attorney, Agent, or Firm—Holman & Stern

[57] ABSTRACT

A safety valve is mounted on an underwater oil well and is remote-controlled from a central control station. The control station is connected to a receiving station, where the valve is disposed, via a single small-section hydraulic line which feeds, at a low rate of flow, a hydropneumatic accumulator for supplying an operating jack of the valve. A manostat switch at the receiving station controls a feed/bleed hydraulic relay of the jack in dependence on the pressures measured in the line at the receiving station. The invention finds application in oil valve safety operations.

11 Claims, 4 Drawing Figures

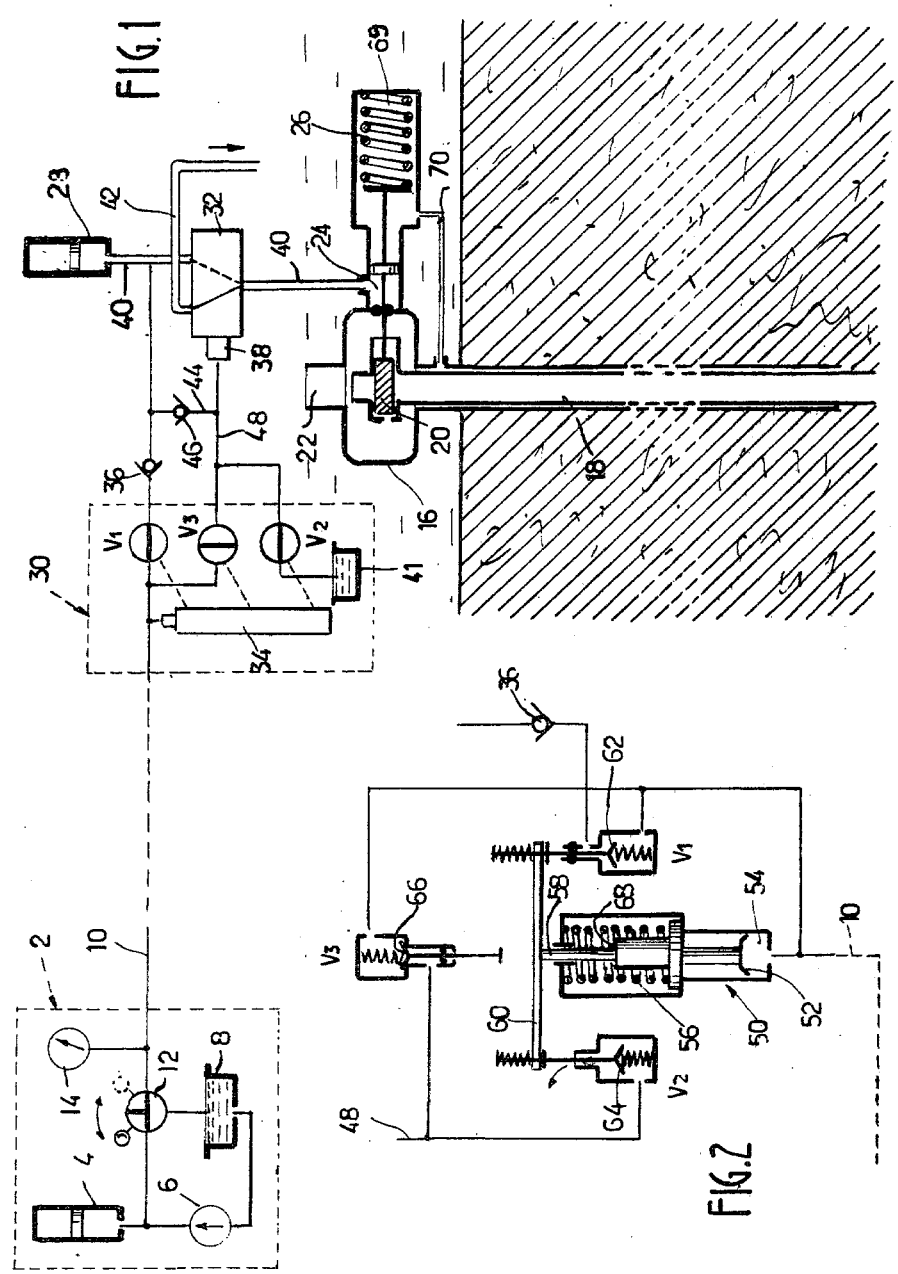

HYDRAULICALLY CONTROLLED SAFETY VALVE

BRIEF SUMMARY OF THE INVENTION

This invention relates to a hydraulically controlled valve and a central-control installation whereby one or more valves at inaccessible locations under normal operating conditions can be remote-controlled.

The invention also relates to a method whereby the opening and closing of a valve at a receiving station at a considerable distance from the control station can be controlled from the latter.

In this description, the general term "valve" is used to denote any device controlling the flow of a fluid in a pipeline, more particularly any device whereby, in one of its positions, the fluid is allowed to flow and, in another of its positions, such flow is prevented. Of course, however, the same term "valve" is also applied to hydraulic or pneumatic switching devices intended to direct the flow of fluid to one or other of a number of paths.

The invention has a particularly advantageous application to cases in which the valves are to be installed in a medium to which an operator normally has no access (e.g. because of the pressure, atmosphere, radiation, electrical voltages, and so on, in such medium) and where, despite such inaccessibility, operation of the valve must be ensured with very great reliability, the operating instructions being transmitted from a remote control station having normal-access conditions.

Hereinafter reference will be made more particularly to valves for controlling the flow of oil from underwater wells. To operate such underwater wells, it is frequently required to be able to control the operation of a number of valves situated at great depth and each interposed between a well head connected to the end of each bore-hole and an oil outlet line communicating with storage tanks situated above the sea level.

Such valves have a very important safety function so that any malfunction of the valves may result in serious consequences. The conditions required are therefore very strict and the following may be cited as examples:

1. Reliable and rapid execution of an instruction for closing the valve.
2. Automatic closure of the valve in the event of an accident at the control station or to the link between the control station and a receiving station where the valve is situated.
3. Rapid operation of the valve closure member, at a controlled speed, both on opening and closing, to prevent erosion due to the oil of the valve members in contact with the oil (valve closure member and seat) in positions intermediate full opening and complete closure.
4. Possibility of re-closing the valve even immediately after an opening operation if necessary.

Of course closure is the essential safety operation and must therefore be executed with the minimun delay between the transmission of the instruction and execution of the operation. In the case of opening, on the other hand, an initial delay before starting the operation is permissible.

French Pat. No. 1 438 480 describes a hydraulically remote-controlled valve, more particularly for underwater oils wells, in which the valve closure member is opened by pressurization of a hydraulic jack which is attached to the closure member and which acts in opposition to resilient means tending to return the closure member to its closed position when the jack is bled or, at least, under low pressure. The control station comprises a source of pressure fluid and a switching means whereby, in one position, said source can be connected to a hydraulic line interposed between the control station and the valve jack, and, in the other position, the line and hence the jack are bled.

A valve of this kind satisfies these conditions and, in particular, safety on closure as a result of the resilient energy which is always available and which tends to re-close the valve closure member as soon as the jack is bled. However, if the distance between the control station and the receiving station is considerable, a connecting line must be provided between these two stations and must have a relatively large cross-section because such line serves not only as an instruction transmission line (bleeding of jacks on closure) but also as a power transmission line (supply to the jack from the source on opening). Consequently, to obtain satisfactory operating times, the line cross-section must be large, and this has the disadvantage of high cost and a complicated installation because of the rigidity of the pipe and its considerable weight.

This invention enables the above disadvantages to be obviated in a valve of this kind and provides all the required operating conditions independently of the length and cross-section of the connecting line.

The method according to the invention consists essentially in locally storing at the receiving station, and hence near the valve, the hydraulic energy required to supply the jack on opening of the valve, and using the connecting line only to transmit operating instructions (in the form of pressure signals) and for supplying the stored energy at the receiving station (without this line having to transmit the considerable power required to supply the jack an opening. Accordingly, a single small-section line can be used which is required to carry only a low rate of flow.

According to the invention, there is disposed at the receiving station a hydropneumatic accumulator in which is stored a hydraulic energy reserve accumulated from the hydraulic fluid supplied at a low rate of flow via the connecting line from the source at the control station. Also disposed at the receiving station is a manostat-controlled hydraulic switching device sensitive to the pressure in the connecting line, at the end thereof situated at the receiving station.

In dependence on the pressure to which it is subjected, the said switching device can principally provide the following hydraulic connections:

1. For a pressure below a specific pressure $p_1$: communication between the connecting line and the accumulator, which is charged up, while the jack chamber is on bleed (valve closed);
2. Between the pressure $p_1$ and the pressure $p_2$: connection between the connecting line and the accumulator is broken.
3. From and above a pressure $p_2$ above $p_1$: the bleeding of the jack chamber is interrupted.
4. For a pressure $p_3$ above $p_2$: the accumulator is connected directly to the valve jack (opening of the valve and holding thereof in the open position) while the connecting line is again connected to the accumulator (recharging thereof to make up the volume of fluid delivered for previously supplying the jack).

In practice, as is conventional in hydraulic control circuits, the said switching device comprises, firstly, a manostat-controlled switching member and, secondly, a hydraulically controlled relay which, from low-power hydraulic signals from the switching member, provides the high-flow hydraulic connections required for rapid operation of the valve.

According to one advantageous embodiment of an installation according to the invention particularly suitable for controlling a plurality of safety valves at a receiving station on a single well-head or at adjacent receiving stations, the installation further comprises: an independent compression station; an additional small-section line connected to the said compression station and dividing up into a plurality of branches near the receiving stations, each branch being individually connected to each of the reserves associated with each valve requiring to be controlled; and a non-return valve fitted to each of the said branches and allowing the fluid to flow only from the compression station to the corresponding reserve.

With this system, the time for the response to the opening orders is reduced because the time required for restoration of the pressure in the individual accumulator of each valve is reduced. Despite the collective additional line provided for charging the accumulators, the individual control of each valve is still totally independent, this being a basic safety condition.

BRIEF DESCRIPTION OF THE SEVERAL VIEWS OF THE DRAWINGS

In order that the invention may be readily understood an embodiment thereof will now be described, by way of example, with reference to the accompanying drawings, in which:

FIG. 1 is a diagram of an installation embodying the invention, illustrating the control station and receiving station mounted at the well-head of an underwater well;

FIG. 2 shows a preferred embodiment of the manostatic switching system used at the receiving station;

Figure 3:
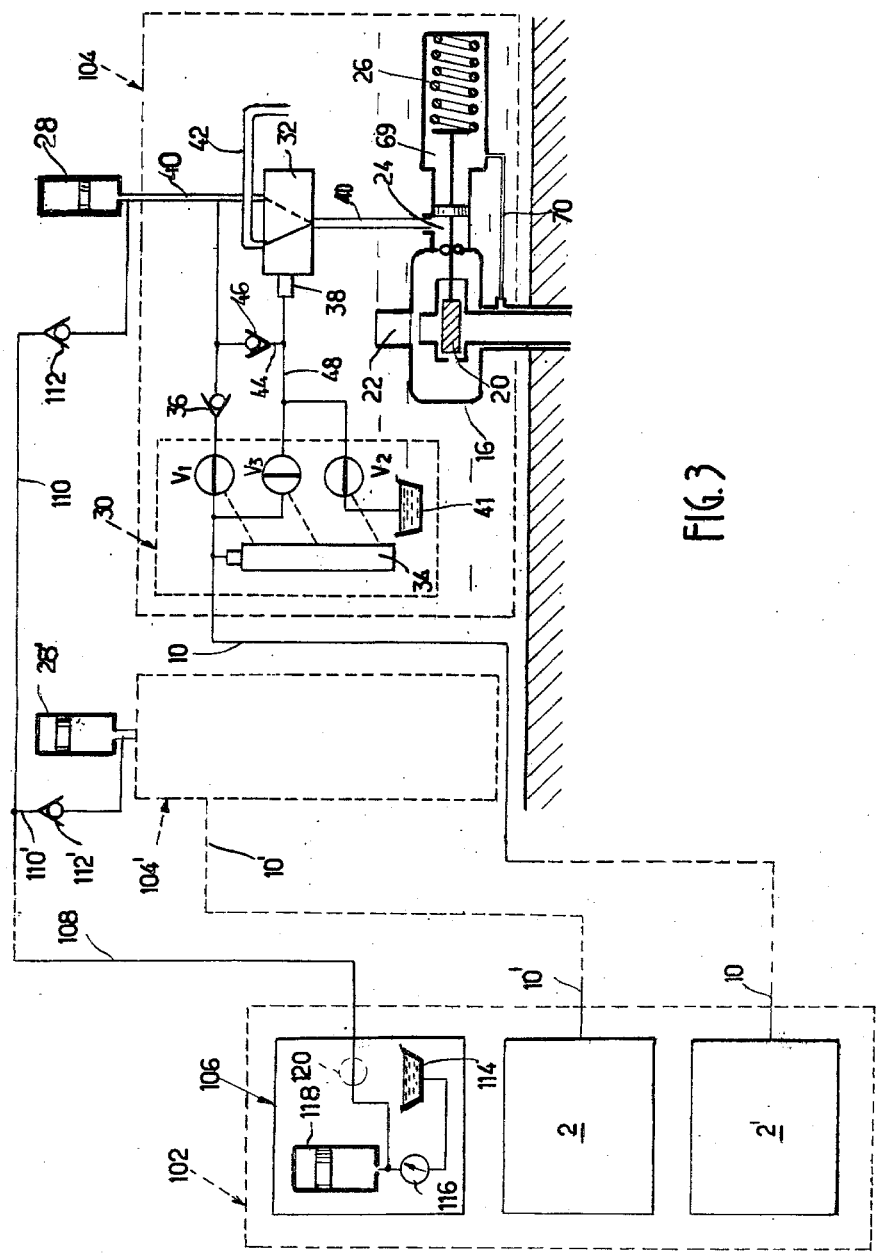
FIG. 3 shows the individual remote-control of a plurality of safety valves.

The hydraulically controlled valve installation for underwater oil drilling illustrated diagrammatically in FIG. 1 comprises a control station 2 which may be installed on land or on a sea platform situated some distance from the well-heads. This control station is similar to that described in the aforesaid French patent and it will be sufficient here to recall that it comprises essentially a hydraulic energy source consisting of a hydro-pneumatic accumulator 4 recharged by a pump 6 from a low-pressure liquid reservoir 8. Accumulator 4 can be selectively connected to a line 10 through the agency of a three-way control valve 12. When the valve 12 is in the position shown by broken lines, the end of the line 10 at the control station is bled, i.e. it communicates with the low-pressure reservoir 8, while the accumulator 4 is isolated from the line. A pressure indicator 14 provided at the control station allows checking of whether the line 10 is under pressure or being bled after actuation of the valve 12, so that it is possible to determine whether the remote-controlled valve is in the open or closed position, as will be seen hereinafter.

Line 10 connects the control station to a receiving station at the sea bed on the well-head provided with the valve to be controlled. This line is the only hydraulic line connecting these two stations and it may be several hundred meters or even some kilometers long according to requirements. It is a pipe of small section, and hence has a low rate of flow and, for example, tubing of 3 mm internal section and 6 mm outside section can be used, this being standard tubing which can be stored in the coiled state and which is therefore easy to transport and install at the sea bed without the need for a large number of connections.

The receiving station is mounted on a well-head 16 capping an underwater drill tube 18. The well-head comprises a valve, e.g. a slide valve 20, which allows oil to flow, or prevents its flowing, to the oil discharge line 22. Valve 20 is actuated for opening by a hydraulic jack 24 which acts in opposition to resilient means, e.g. a spring 26, which tends to re-close the valve and hold it closed.

The receiving station comprises an oleo-pneumatic accumulator 28, manostatically controlled switching means 30 and a hydraulic relay 32 which carries out the hydraulic switching operations at a high rate of flow as required for operation of the valve 20 in response to the pressure signals it receives from at least some of the switching means 30. The line 10 from the control station terminates at the receiving station.

In the embodiment shown diagrammatically in FIG. 1, the manostatically controlled switching means 30 comprise three valves $V_1$, $V_2$, $V_3$ actuated sequentially by a manostatic control means 34 which is subjected to the pressure in the line 10 at its end situated at the receiving station. One embodiment of these valves and their manostat will be described with reference to FIG. 2, but it is simpler to describe the functions of the different valves by reference to FIG. 1.

Valve $V_1$ is interposed, with a non-return valve 36, between the line 10 and the accumulator 28, valve $V_2$ is interposed between the control input 38 of relay 32 and a low-pressure medium 41 (e.g. the sea) and valve $V_3$ is interposed between the control input 38 of relay 32 and line 10.

Relay 32 is an intake/bleed relay which in its first position (shown in broken lines in FIG. 1) connects accumulator 28 to jack 24 via short large-section lines 40 (for opening valve 20 and holding it in the open position) and which, in its second position (shown in solid lines in FIG. 1), connects jack 24 to a low-pressure bleed line 42 which can, for example, discharge to the sea (closure of valve 20 by action of spring 26).

The manostatic control system 34, which is sensitive to the pressure detected in the line 10 at the receiving station, is so controlled as to sequentially actuate the valves $V_1$, $V_2$, $V_3$ at specific increasing pressured $p_1$, $p_2$, $p_3$, starting from the initial position of the valves shown in FIG. 1 corresponding to a measured pressure p less than $p_1$. This initial position is as follows: $V_1$ open, $V_2$ open, $V_3$ closed.

In these conditions, the control input 38 of relay 32 is on bleed, and the relay is therefore in the position shown in solid lines in FIG. 1, i.e. the jack 24 is on bleed and valve 20 is urged into and held in the closed position by spring 26.

If valve 12 is opened at the control station, the hydraulic fluid is fed, by the source comprising the accumulator 4 charged by the pump 6, to the line 10 and to the receiving station, such supply being only at a low rate of flow because of the small section and considerable length of the line 10.

When valve $V_1$ is open, this small flow charges the accumulator 28 to pressure $P_1$. This first filling of the accumulator may therefore require some time because of the small supply flow but, as was seen, this initial delay before the first opening operation has no disadvantage.

When the manostat system detects the pressure $p_1$, it closes the valve $v_1$ and the valve 20 is then ready for the opening operation. The control valve 12 at the control station stays open and the pressure continues to rise at the receiving station and, at a specific pressure $P_2$, the manostat system 34 closes the valve $V_2$, so that the control input 38 of relay 32 is no longer on bleed and is ready to receive a pressure signal controlling switching of the relay into its other position.

When the pressure detected reaches the level $p_3$, the manostat system 34 opens the valve $V_3$ so that the control input 38 of the relay is subjected to the pressure of the line 10 and, in the relay, establishes communication between the accumulator 28 and the jack 24 (in broken lines in FIG. 1).

This communication is a short large-section link so that the hydraulic energy accumulated in the accumulator 28 rapidly actuates the jack 24 to open the valve 20 against the action of the spring 26. Valve 20 will therefore remain open for as long as the control valve 12 of the control station stays open, the open position of the valve 20 being shown, at the control station, by the pressure indicated by the pressure gauge 14.

During the open period of the valve, a hydraulic link 44 containing a non-return valve 46 connects the accumulator 28 to a line 48 for monitoring the transmission of the instruction signal to the relay, so that the accumulator is recharged to compensate for the volume of liquid that it has delivered to the jack 24 to open the valve 20. This additional refilling is therefore at a low rate of flow up to the pressure of the source.

As a result of this recharging, the accumulator is ready—even after a relatively short open time of the valve 20—to re-start a new opening operation without any prior delay.

To close the valve 20, the control valve 12 of the control station is set to the bleed position, so that the liquid is rapidly depressurized in the entire line 10. The manostat system 34 detects the pressure drop $p_3$, $p_2$, $p_1$ and successively actuates the valves $V_3$, $V_2$, $V_1$ to return them to the initial position shown in FIG. 1. As soon as valve $V_2$ opens, the control input of relay 32 is set to bleed and this relay establishes connection between the jack 24 and the bleed output 42, this connection also being a short large-section one. Consequently, spring 26 pushes back the piston of jack 24, which is rapidly bled and at the same times drives the valve 20 into the completely closed position. At the control station this closed position of the valve is shown by the low pressure indicated by the gauge 14.

There is therefore complete reliability on closure as a result of the energy of the spring 26 always being available and the high speed with which the jack 24 is bled.

Furthermore, opening of the valve cannot be triggered until the pressure in the accumulator is high enough (pressure $p_1$) to guarantee complete opening of the valve 20 at the proper speed. The reason for this is that after the normal operating cycle described above the accumulator is completely charged and therefore ready to carry out a new opening operation. If, for some reason, the valve 20 is left in the open position only for too short a time to complete charging of the accumulator, which would be charged only at a pressure below $p_1$, return of the valves $V_1$, $V_2$, $V_3$ to their position would allow an opening operation to be carried out only if the pressure measured by the manostat system has exceeded the pressure $p_1$, i.e. only when the accumulator is charged enough to provide a complete opening operation at the proper speed.

It will therefore be seen that all the safety requirements are satisfied with just one hydraulic link between the control station and the receiving station in the form of a single small-section line.

The resilient means tending to re-close the valve 20 are described hereinabove as being in the form of a metal spring 26 but of course hydro-pneumatic resilient means could be used, e.g. a double-acting jack 24, the second chamber of which would be subjected to the pressure of a liquid stored in a hydro-pneumatic accumulator, e.g. accumulator 28.

FIG. 2 shows an embodiment of the manostat control system and the valves $V_1$, $V_2$, $V_3$ associated therewith. This system comprises a manostat 50, the piston 52 of which defines a pressure chamber 54 which receives the pressure from line 10. The piston is urged by a calibrated biasing spring 56 and through the agency of a rod 58 it moves a plate or arm 60 which closes the discs 62-64 of the valves $V_1$, $V_2$. The stroke of the valve discs is so selected that as the piston 52 rises by the action of the increasing pressures the valve disc 62 of valve $V_1$ closes for pressure $p_1$, followed by valve disc 64 of valve $V_2$ for pressure $p_2$. As it continues its stroke under the action of the increasing pressures, plate 60 will open the disc 66 of valve $V_3$ at pressure $p_3$. A shoulder 68 of rod 58 prevents plate 60 from rising above the position corresponding to full opening of the valve disc 66 for pressures above $p_3$. The operation of the system is identical to that described in connection with FIG. 1 and there is no point in describing it again. The three pressure levels $p_1$, $p_2$, $p_3$ can be selected to be as close as possible within the limits of the accuracy of the manostat 50.

Of course each valve $V_1$, $V_2$, $V_3$ could be actuated by its own manostat, but in that case the adjustments would be more complex than with a single manostat. It is also possible to combine a plurality of valves into a single switching means, e.g. valves $V_2$-$V_3$ could be combined in a common feed/bleed valve. The hydraulic relay 32 may be any known type of feed/bleed valve controlled by hydraulic pressure and does not require fuller description.

Of course, as in the aforesaid French patent, all the main components of the receiving station may be grouped in a bell to form a compact assembly which is readily fitted on the well-head. The chamber 69 of jack 24 containing the closure spring 26 for valve 20 may communicate with the sea or be connected, via a tube 70, to the drilling casing 18, the pressure of the oil then being combined with the action of the spring 26 to urge the valve 20 into the closed position.

Since all the connecting pipes in the receiving station are short and of large cross-section, the pressure losses in these pipes are sufficiently low for the pressure in the accumulator 28 and the pressure in the manostat system 34 to be considered equal.

All the components at the receiving station are conventional hydraulic components requiring neither supervision nor maintenance.

It has already been pointed out that the reserve (accumulator 28) is charged with hydraulic fluid under pressure when the single small-section line connecting the control station to the receiving station is pressurized, i.e. when the valve opening instruction is given.

It was also seen that filling of the accumulator (particularly the first filling) requires some time, i.e., the opening operation may take a relatively long time to start because after an opening instruction has been transmitted by the control station the reserve at the receiving station must be sufficiently filled to reach the minimum pre-determined pressure allowing the valve opening operation to take place.

When the valve stays open for a sufficient time, the reserve at the receiving station is finally charged to a pressure close to the control station pressure which is greater than the said predetermined minimum pressure. If the capacity of the reserve at the receiving station is high enough, a number of successive opening operations can be carried out without recharging the said reserves.

Generally, a plurality of valves are fitted to the oil well-heads, the assembly of such valves forming a Christmas tree.

In the case of a plurality of valves to be controlled, total independence of each valve is ensured, this being an essential safety element. The reason for this is that the control station assembly comprises a pump, a low-pressure oil reserve, and a high-pressure oil reserve for each valve; the link between the control station and the receiving station comprises a single individual line for each valve; finally, the receiving station assembly comprises, for each valve, a pressure fluid reserve and the feed/bleed distributor switching means.

Another embodiment will now be described with reference to FIGS. 3 and 4 to obviate the disadvantage due to the delay in charging (or replenishing the charge) of the reserve, i.e. the time required for opening the valve, while maintaining total independence of each valve in the case of a plurality of valves fitted to a single receiving station.

In this embodiment, there is provided at the control station an independent compression station connected to an auxiliary additional line which has small cross-section and which divides, near the, or each, well, into a plurality of branches each individually feeding the reserve for each valve through the agency of a non-return valve; the reserves are thus fed during the period when the valves are closed.

The strict independence of the valves, which is an essential safety requirement, is satisfied by the nonreturn valves being provided. Also, since the fluid supplied by the single line is used only to supply the individual reserves for the valves, there is no risk of any additional oil return to the control station and hence no disturbance to the independent operation of the valve equipment as a result.

FIG. 3 is a similar view to FIG. 1 but shows the control of a plurality of valves (two in this example) generally mounted on the same well-head, from a general control station 102.

Each valve, e.g. valve 20, has its own actuating assembly 104-104', which controls its manostat switching means 30, its hydraulic relay 32, its actuator jack 24 and its hydro-pneumatic accumulator 28-28'. Each assembly 104-104' is individually connected, via a single small-section line 10-10' respectively to its own control station 2-2' situated at the general control station 102.

So far, therefore, this is simply a duplication of the installation described in connection with FIG. 1, each valve that has to be controlled retaining its complete independence.

However, the general control station 102 not only contains individual control stations 2-2', but also an independent additional compression station 106 which feeds a collective additional small-section line 108 which, near the, or each, well, divides into a plurality of branches 110-110' individually feeding the reserve for each valve, i.e., the accumulator 28-28' of each assembly 104-104', with the interposition of a non-return valve 112-112'.

Figure 4:
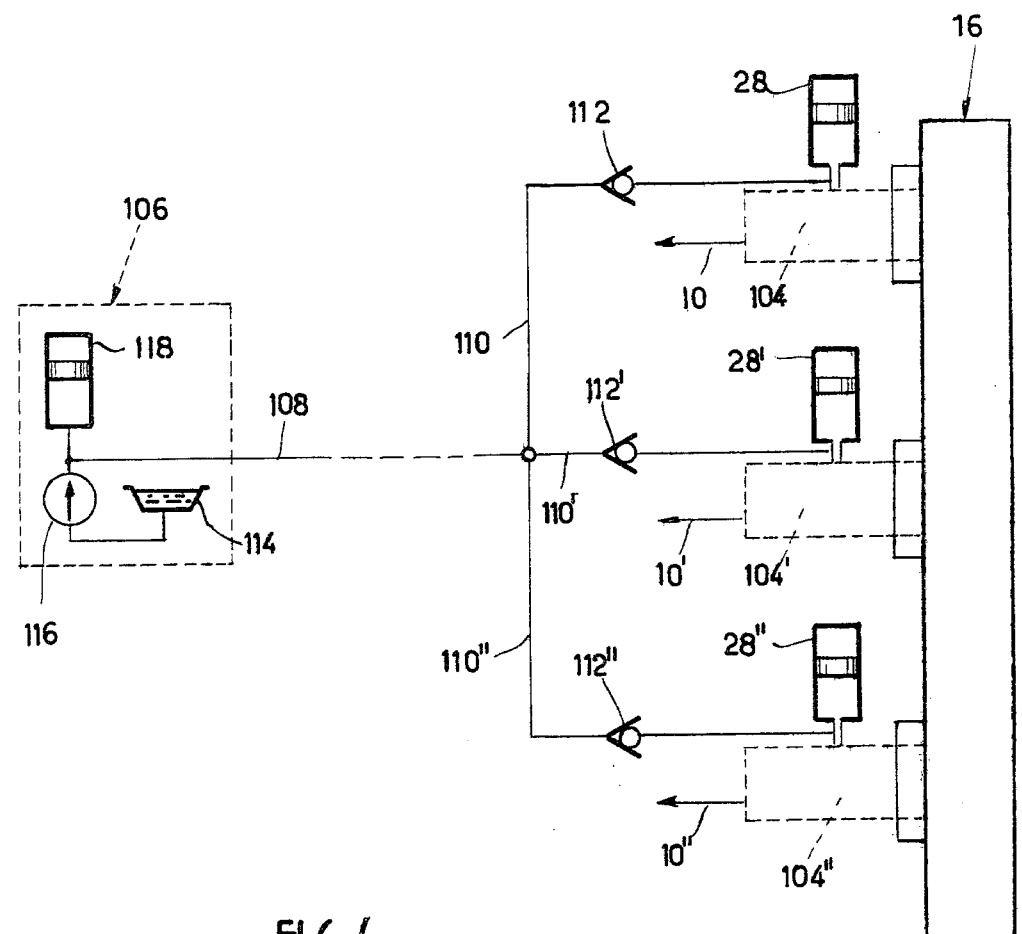
FIG. 4 is a separate diagram showing an additional supply circuit for the individual reserves of hydraulic pressure fluid for each of the valves.

FIG. 4 only shows the collective additional feed system for three valves mounted on a well-head 16. In order to avoid overloading the drawing, FIG. 4 does not show the independent individual installation for each valve shown in FIGS. 1 and 3.

The additional compression station 106 comprises at least one low-pressure oil reserve 114, a pump 116 and a hydro-pneumatic accumulator 118. A valve 120 can be provided on the line 108 and conventional pressure regulating and monitoring means (not shown).

The installation operates as follows: When the installation is started, and before the first opening instruction is transmitted to one or other of the valves, the compression station 106 is operated at the general control station 102 to charge the individual accumulators 28-28'-28'' of the valves to above the predetermined pressure $p_3$.

The installation is then ready to receive the first opening instruction for a valve (from one or other of the individual control stations 2-2'). This instruction is therefore executed without any delay, since there is no need to wait, as in FIG. 1, for the individual accumulator 28-28' to be filled via the order transmission line 10-10'.

As soon as an opening operation has been carried out on one of the valves, the pressure falls in the corresponding accumulator because of the consumption of the corresponding jack 24, but the accumulator is immediately re-charged via its additional line 110, the non-return valve 112 of which opens.

Also, during the period when the valve is open, as explained in connection with FIG. 1, the accumulator is also re-charged via its individual line 10.

This system avoids the initial relatively long delay in response to the first opening instruction and reduces the time for restoration of the pressure in the accumulator after a valve opening operation.

However, it will be apparent that the complete independence of the individual control of each valve is satisfied, since the non-return valves 112-112'-112'' prevent any return of oil from the additional circuit to the control circuit. There is therefore no risk of any disturbance to the independent operation of the valve equipment. It will also be seen that if the additional circuit (shown separately in FIG. 4) does not operate, the opening and closing reliability of each valve is satisfied.

I claim:
1. In a safety valve control installation comprising:
   a control station having a source of fluid under pressure;
   a safety valve situated at a receiving station remote from said control station, said safety valve having a closure member;
   a fluid operated jack attached to said closure member for actuating said closure member in an opening direction on pressurization of said jack;

resilient means acting in opposition to said jack for returning said closure member to the closed position when said jack is under low pressure;

a single small-section fluid flow line connecting the source of fluid under pressure at said control station to said receiving station and comprising, at said control station, a control valve permitting to selectively connect said line to said source or to a discharge means;

a fluid energy accumulator at said receiving station; and a pressure-controlled feed/bleed relay connected between said accumulator and said actuating jack and having a control input;

the improvement comprising manostat means sensitive to the pressure in said line for successively actuating individual valve means which regulate, in response soley to said line pressure, a unidirectional communication of said line pressure with said accumulator, a closing of a communication of said relay control input with an outlet through one of said valve means in response to increased line pressure detected by said monostat means, and a communication of said line pressure through one of said valve means to said relay control input and unidirectionally to said accumulator in response to a further increase in line pressure detected by said monstat means.

2. An installation as claimed in claim 1, wherein said valve successively actuated means comprises first, second and third valves and said manostat means comprises a manostat having a pressure measuring chamber which is permanently connected to said line and having a movable member which successively actuates said first, second and third valves in response to the pressure in said chamber.

3. An installation as claimed in claim 2, wherein said first valve is interposed between said line and said accumulator, said second valve is interposed between said relay and a low-pressure fluid tank and said third valve is interposed between said relay control input and said line.

4. An installation as claimed in claim 3, wherein a non-return valve is interposed between said first valve and said accumulator.

5. An installation as claimed in claim 3, comprising a hydraulic link containing a non-return valve and connecting said accumulator downstream of said third valve.

6. An installation according to claim 1, wherein said manostat means comprises an individual manostat for actuating each of said individual valve means.

7. An installation as claimed in claim 2, wherein said first, second and third valves are combined into a single feed/bleed valve for said relay control input.

8. An installation as claimed in claim 1, wherein the hydraulic links between said accumulator, said relay and said jack are short large-section lines able to carry a high rate of flow.

9. An installation as claimed in claim 1, wherein a pressure gauge is provided in said line at said control station, whereby the open or closed positions of said safety valve at said receiving station are indicated by said pressure gauge.

10. An installation as claimed in claim 1, for controlling from a single control station a plurality of safety valves situated at a receiving station, wherein said installation is provided with:

an independent compression station;

an additional small-section line connected to said compression station and divided into a plurality of branches near said receiving station, each branch being individually connected to a respective fluid energy accumulator associated with a respective safety valve; and a non-return valve in each of said branches allowing fluid to flow only from said compression station to said respective accumulator.

11. An installation as claimed in claim 1, wherein said safety valve is the safety valve of an underwater oil well.

* * * * *